United States Patent
Light et al.

(10) Patent No.: US 6,175,616 B1
(45) Date of Patent: Jan. 16, 2001

(54) METHOD AND APPARATUS FOR OBTAINING TELEPHONE STATUS OVER A NETWORK

(76) Inventors: Elliott Light, 12 Bentana Way, Rockville, MD (US) 20850; Jon L. Roberts, 529 Clear Spring Rd., Great Falls, VA (US) 22066

( * ) Notice: Under 35 U.S.C. 154(b), the term of this patent shall be extended for 0 days.

(21) Appl. No.: 08/963,373

(22) Filed: Oct. 20, 1997

(51) Int. Cl.[7] .................................................. H04M 1/64
(52) U.S. Cl. ..................................... 379/88.14; 379/88.12
(58) Field of Search ...................... 379/62.1, 69, 88.12, 379/88.17, 88.22, 90.01, 93.01, 201, 213, 214, 215, 34, 88.13, 88.14, 88.15, 88.16

(56) References Cited

U.S. PATENT DOCUMENTS

| | | | |
|---|---|---|---|
| 3,989,899 | 11/1976 | Norwich | 179/2 DP |
| 4,166,929 | * 9/1979 | Sheinbein . | |
| 4,559,416 | 12/1985 | Theis et al. | 179/7.1 R |
| 4,734,931 | 3/1988 | Bourg et al. | 379/93 |
| 4,759,055 | * 7/1988 | Okumura et al. | 379/157 |
| 5,023,868 | * 6/1991 | Davidson et al. | 379/211 |
| 5,425,091 | * 6/1995 | Josephs | 379/201 |
| 5,500,893 | 3/1996 | Onosaka | 379/396 |
| 5,530,740 | 6/1996 | Irribarren et al. | 379/89 |
| 5,647,002 | 7/1997 | Brunson | 380/49 |
| 5,943,399 | * 8/1999 | Bannister et al. | 379/88.17 |

* cited by examiner

*Primary Examiner*—Scott L. Weaver
(74) *Attorney, Agent, or Firm*—Roberts Abokhair & Mardula, LLC

(57) ABSTRACT

A telephone status monitoring method an apparatus that monitors the status of a called party's telephone to maximize the probability of a calling party reaching the called party. The system uses a telephone status monitor to monitor the various characteristics and condition of consumer telephones such as on-hook/off-hook, number of rings to voice mail, call forwarding information and other consumer options for telephone service that are offered by telephone companies. A calling party that desires to know if a called party is available accesses a telephone status file over a network and determines if the called party is available. If the called party is available, a call can be placed. By periodically updating the telephone status file, the telephone status monitor keeps the file current for the telephones being monitored. Other capabilities allow for e-mail conversion to voice mail and "beeping" a calling party when a called party telephone is available for a call.

4 Claims, 4 Drawing Sheets

METHOD AND APPARATUS FOR OBTAINING TELEPHONE STATUS OVER A NETWORK

BACKGROUND OF THE INVENTION

This invention relates generally to electronically determining the status of a telephone over a network. More specifically the present invention provides a method and apparatus for obtaining the status of a telephone, whether on-hook, off-hook, or other telephone information over a network in order to maximize the probability of reaching a desired party. It also provides a method and apparatus for sending an e-mail to the desired party for storage as a voice mail message.

BACKGROUND ART

Literally millions of times per day parties attempt to contact one another only to find that the party initiating the telephone call receives a busy signal or is put into the phone mail of the receiving telephone when that telephone is off hook. Not only is this experience frustrating for the caller, but can result in lost business or social opportunities on the part of the receiving party who is on the line speaking with someone else. In addition, receiving busy signals and the inability to complete telephone calls results in the loss of millions of dollars in revenue both from the time expended by the caller in trying to reach the desired party as well as lost opportunities for commerce or other social contact.

Telephone line activity monitoring has been the subject of invention in the past. For example, U.S. Pat. No. 4,559,416 to Theis, et. al. describes a form of line activity monitoring for the purpose of obtaining information regarding statistics of line usage. This system detects the usage of the line, but does not transmit status information to others in any current fashion.

U.S. Pat. No. 3,989,899 to Norwich describes yet another monitoring system whose purpose is to notify an operator that a telephone line is open so that a desired message can be delivered by the operator to a receiving party. This system comprises an automatic dialer which attempts to reach individuals on a repetitive basis until a connection is made. Again, status of the telephone at any given point of time is not provided.

U.S. Pat. No. 4,734,931 to Bourg, et. al. describes an integrated calling directory comprising a personal computer that stores information about the numbers being called. It does not address the problem associated with the called party telephone being in an off-hook condition. This is not reported in any fashion to the initiator of the telephone call.

U.S. Pat. No. 5,530,740 to Irribarren, et. al. describes a communication system comprising a voice message system for storing and retrieving voice messages and faxed data and for converting text into voice messages. This system does not deal with the issue of how to contact the party receiving the phone call but only leaves a message for that party in the event that the phone is in an off-hook condition.

U.S. Pat. No. 5,500,893 to Onosaka is yet another information processing system having a telephone and an informational processing device. Again, this invention does not address the issue of whether a called party telephone is in an on-hook or off-hook condition.

U.S. Pat. No. 5,647,002 to Brunson describes a system for synchronization of mail boxes over a network. This system is designed to insure that information in electronic mail is complete in a series of different mail boxes. The issue of providing information to a caller regarding the status of a called party's telephone is not dealt with.

What is desired is a system whereby a calling party can pre-determine the status of a called party's telephone such as on-hook, off-hook, number of rings to phone mail and other consumer telephone status information so as to maximize the opportunity for completing a telephone call to the desired party.

DESCRIPTION OF THE INVENTION

It is therefore an object of the present invention to maximize the probability that a calling party will actually contact a called party when a telephone call is made.

It is a further objective of the present invention to provide a status of the called party's telephone such as on-hook, off-hook, number of rings to phone mail, phonemail characteristics and other telephone information before the calling party makes the telephone call to the called party.

It is a further objective of the present invention to provide telephone status information over a network.

It is a further objective of the present invention to otherwise alert a calling party via beeper or other indicia that a called party is available.

It is a further objective of the present invention to continually monitor the status of a telephone in order to provide the telephone status information desired.

It is a further objective of the present invention to store telephone line status in a file that can be accessed by others.

It is a further objective of the present invention to constantly update the telephone line status file so that callers accessing the file can have an up-to-date record of the status of a telephone to be called.

These and other objectives of the present invention will become apparent from a review of the general and detailed descriptions that follow. The present invention provides a method for a calling party to receive constantly updated information concerning the status of a telephone to be called, for example on-hook, off-hook, number of rings before phone mail, call forwarding and other information concerning the number being called (collectively "consumer options"). For purposes of this specification this range of information will generally be called the "telephone status."

The present invention comprises a monitoring system which constantly polls a series of a telephones and stores information concerning the telephone status in a telephone status file. That file is one that, in a preferred embodiment, can be accessed over the Internet. When a calling party desires to maximize its probability of actually being connected with a called party, the calling party accesses the telephone's file over the Internet and receives a determination of whether the called telephone is on-hook or off-hook. When an off-hook condition is noted, the calling party will not attempt to place the telephone call. In addition, the calling party may elect to alert the called party that a call was attempted, to send an e-mail and have the e-mail delivered as a voice mail message, or to be signaled when the called party's phone is on-hook. When the telephone status is noted as on-hook, the calling party can then make the telephone call with some reasonable assurance of reaching the telephone of the called party.

This system differs from existing private branch exchanges (PBX) in that a current PBX can have a "camp on" feature that allows a calling party to place a phone call to a telephone on the PBX, note that the called telephone is off-hook, and "camp on" to the called party's telephone line so that when an on-hook condition is noted, the PBX can automatically connect the calling party to the called party. The difficulty with such camp on systems is that they cannot be used by people outside the PBX. In addition, when using the camp-on feature, the call is "camped" only after it is placed. The caller still has invested both time and money in exchange for a busy signal.

In contrast to existing PBX camp on systems, the system and method of the present invention allows a calling party to be advised of the status of a telephone via the Internet and place a call to that telephone to maximize the probability of actually making the desired connection.

An alternative embodiment of the present invention is to connect the calling party's telephone to the computer at the calling party's location. Thereafter, upon a determination by the calling party's computer that the status of the called party's telephone is such that a call can be made, the calling party's computer will then dial the calling party's telephone prompting the calling party to pick that telephone up and thereafter dial the called party's telephone thereby completing the telephone call in an automated fashion. It should be noted that while the term "computer" is used in the present specification, it is anticipated to be within the scope of the present invention to have special purpose equipment to accomplish the specific tasks and functions described below.

A further embodiment of the present invention is to use the calling party computer to send the called party an e-mail and to have the e-mail converted to voice mail and delivered to the called party's voice mail box.

A further embodiment of the present invention involves the calling party to be notified via beeper or otherwise that a called party telephone is available. This is especially useful when the calling party must be away from a telephone for a period of time and cannot access the Internet to determine the called party telephone status.

The present invention is more fully described by reference to the figures that follow.

LISTING OF THE FIGURES

DETAILED DESCRIPTION OF THE INVENTION

Figure 1:
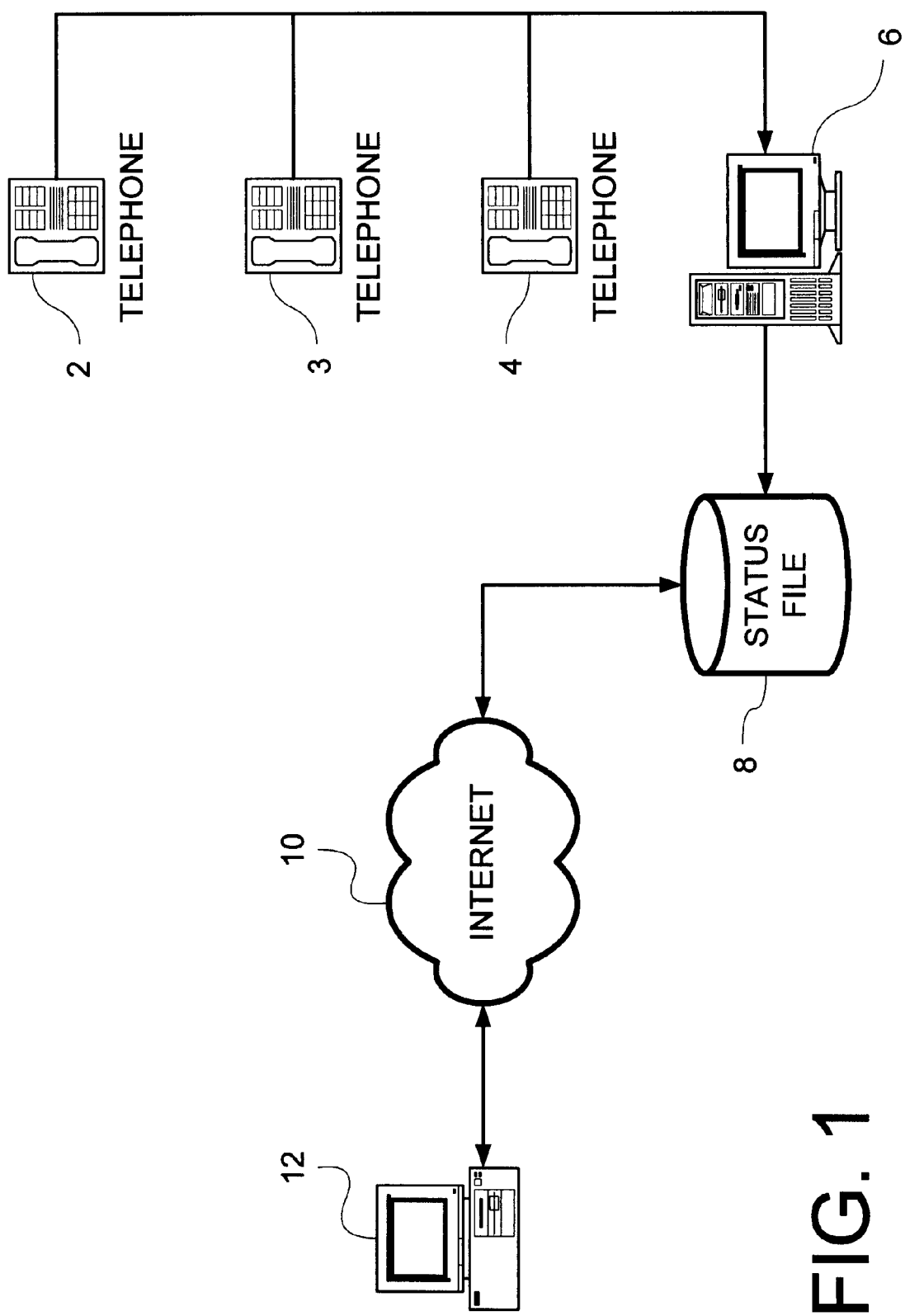
FIG. 1 shows the basic architecture of the telephone status monitor.

Referring to FIG. 1 the general architecture of the telephone status monitor is described. Using a personal computer or other similar type of processor 12 a calling party accesses a network, in this case the Internet 10, although the invention is not so limited. Any network that can be connected to a calling party and a called party can also be used. The calling party is then connected to the telephone status file 8 which is continually updated by a telephone status monitor 6 which constantly monitors a series of telephone 2,4. It should be noted that it is anticipated that many thousands of telephones will be monitored in this fashion. Eventually it is anticipated that millions of phones will be so monitored.

The status file 8 is continually updated by monitor 6 with the on-hook or off-hook status of telephones that are monitored. Thus the calling party Computer 12 can receive "real time" status (as determined by the sampling rate of the monitor) of a telephone being called by simply monitoring the status file.

Since the status file in anticipated to contain many thousands of numbers it is anticipated as part of the present invention that when a calling party Computer 12 requests the status of a particular telephone that only the status of that telephone will subsequently be displayed on the calling party Computer. Alternatively, the calling party Computer 12 may create a list of numbers to monitor and have the data "pushed" over the Internet 10 to the calling party Computer 12.

Figure 2:
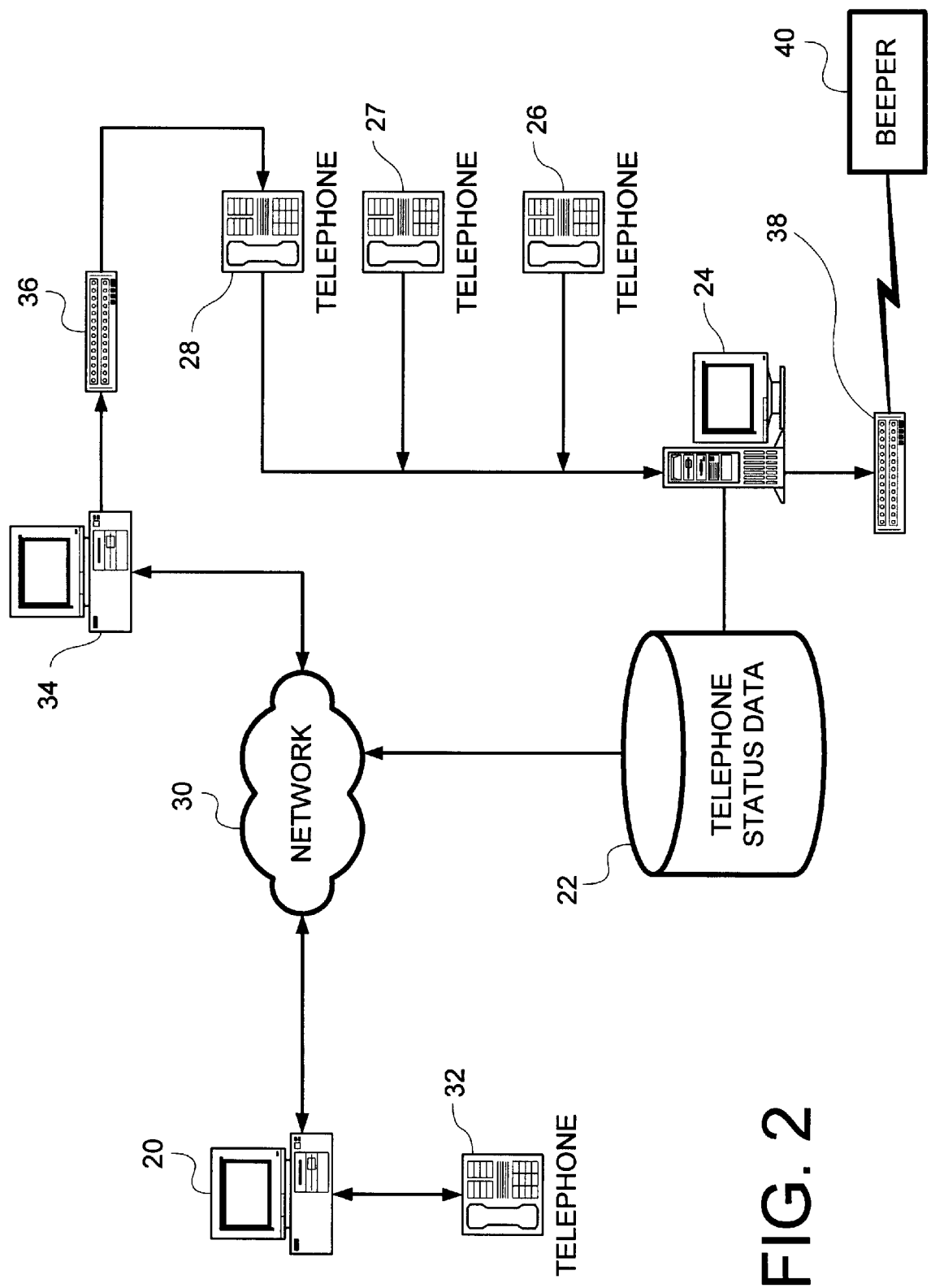
FIG. 2 shows an alternate embodiment of the telephone status monitor.

Referring to FIG. 2 an alternate embodiment of the present invention is shown. In this case calling party computer 20 accesses the telephone status file 22 over the Internet 30. Again, the status file 22 is continually updated by a telephone status monitor 24 which monitors telephones 26, 27 and 28 (again these are representative of a plurality of telephones fully monitored by the system). In this case however the calling party has a telephone 32 that is connected to the calling party's computer 20. When the calling party computer 20 monitors the status of a called party via the status file 22, as soon as the called party status indicates an on-hook condition, the calling party computer 20 will dial the calling party's telephone 32. Upon sensing an off-hook condition on the calling party's telephone 32 the calling party computer 20 will then place a telephone call to the called party thereby making the entire connection process an automated one.

Referring again to FIG. 2, the calling party may also send an e-mail to the called party's computer 34. The e-mail is converted from text to digital voice at converter 36 and routed to the voice mail box of the called party.

Referring again to FIG. 2, if the calling party must be away from the telephone yet still wants to know when a called party is available fro a telephone call, the present invention also comprises a "Beeper" capability 38 to send a message to a beeper 40 of the calling party notifying the calling party that the called party is available for a telephone call.

Figure 3:
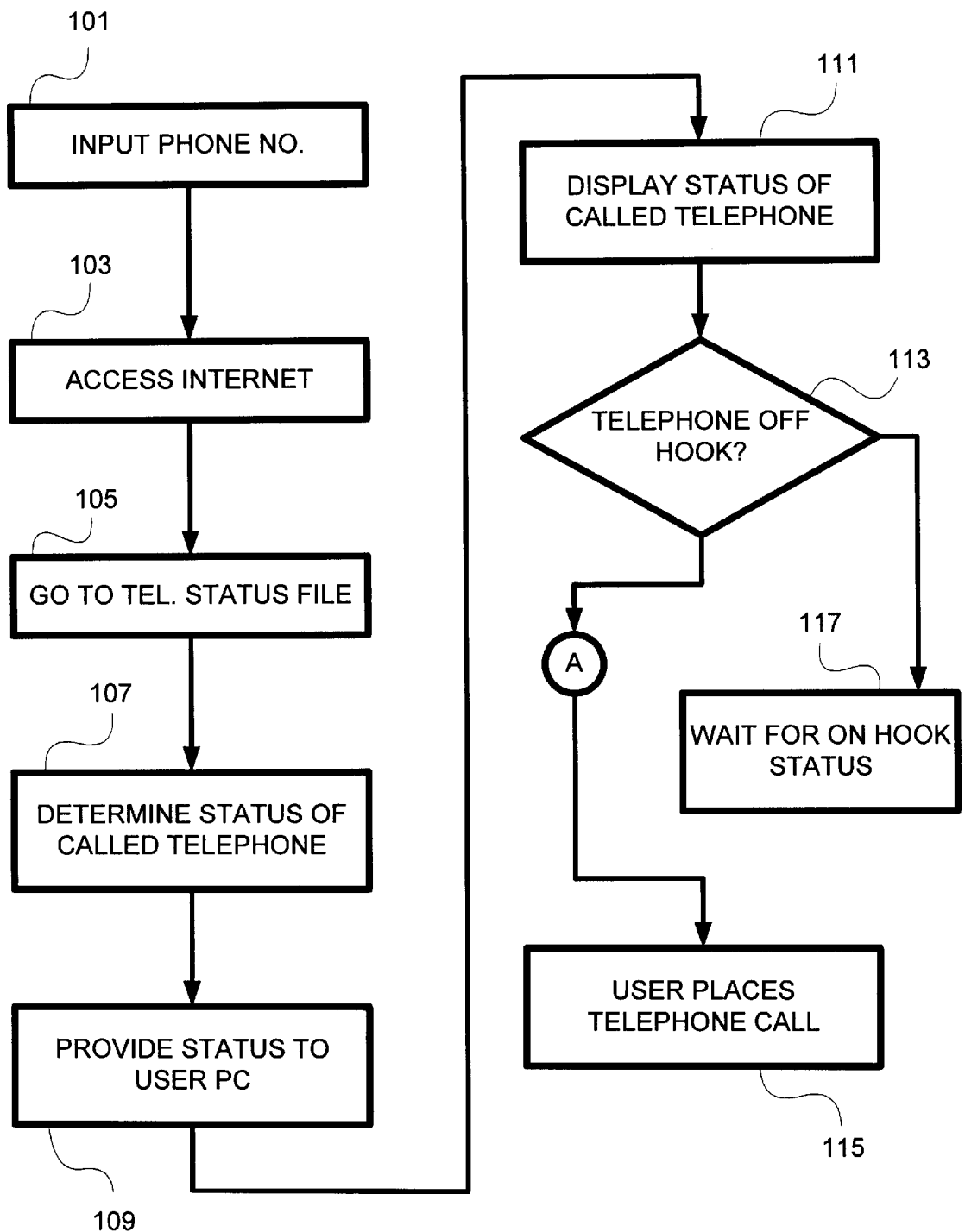
FIG. 3 shows the process of the telephone status monitor.

Referring to FIG. 3 the flow of the method of the present invention is shown. A calling party, having a Computer inputs a telephone number to be called (the called party) 101. Thereafter the calling party's Computer accesses the Internet 103 subsequently accessing the telephone status file 105. The status of the called telephone party's telephone number is then determined 107 and that status is provided back to the calling party's Computer 109 noting that status of the called party's telephone line.

Upon receipt of the called party's status, that information is displayed for the calling party 111 and thereafter, if the called party's telephone line status is in an on-hook condition 113, the calling party can then call the called party 115. Otherwise, the calling party simply waits for an on-hook condition to be sensed 117.

Figure 4:
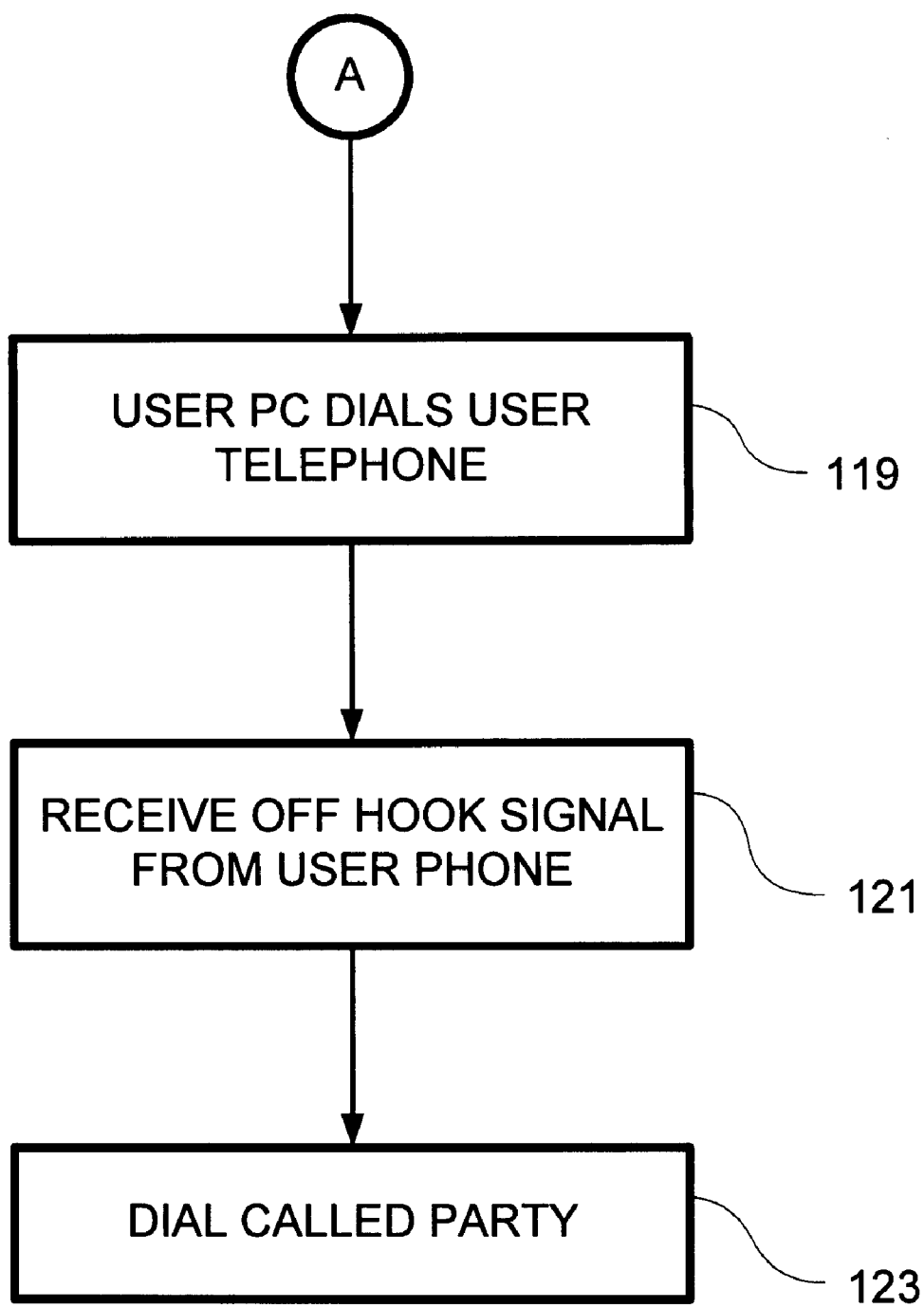
FIG. 4 shows an alternate embodiment of the process of the of the telephone status monitor.

Referring to FIG. 4 an alternate embodiment of the present invention is shown. All of the steps of the access to the status of the called party's telephone line is the same is noted previously in FIG. 3. However, instead of the calling party making the telephone call, the Computer continually monitors the telephone status file. Upon noting that the dialed telephone status is in an on-hook condition the Computer dials the calling party's telephone 119. The calling party Computer then waits to receive an off-hook signal from the calling party's telephone 121 thereby signifying that the calling party is on the telephone ready to make the telephone call, the Computer then places the telephone call to the receiving party's telephone 123 thereby completing the telephone call. It should be noted that at the present time it is possible to place a telephone call over the Internet. Therefore the Computer can place the call over the Internet to a calling party's telephone or in the alternative the Computer can simply place a call over the public switch telephone network to called party's telephone.

As noted earlier, the calling party also has the option of placing an e-mail message over the network to the called party. The e-mail message is converted in a computer either at the called party or in a central switch to a digital voice message for deposit in the voice mailbox of the called party. In this fashion the called party can receive voice mail from the calling party's computer.

A telephone line status monitoring system and method has been described herein. It will be appreciated by those skilled in the art that minor modifications to the present invention could be made without departing from the spirit of the invention as disclosed. For example, a variety of telephone status information is kept at telephone companies' central switches. Any of this telephone information such as voice mail status, number of rings to voice mail, call forwarding numbers and other such telephone information is all available from telephone companies. This telephone status information is anticipated by the present invention as being availible in the context of the present invention.

We claim:

1. A system for obtaining telephone status over a network comprising:
   a calling party computer;
   a network to which the calling party computer is connected;
   a plurality of telephones;
   a telephone status monitor connected to the plurality of telephones for monitoring a telephone status of the plurality of telephones; and
   a telephone status file connected to the telephone status monitor for receiving the telephone status from the plurality of telephones, the telephone status file connected to and accessible via the network;
   wherein the telephone status is a consumer option selected from the group consisting of: number of rings to voicemail and call forwarding.

2. A system for obtaining telephone status over a network comprising:
   a calling party computer;
   a network to which the calling party computer is connected;
   a plurality of telephones;
   a telephone status monitor connected to the plurality of telephones for monitoring a telephone status of the plurality of telephones;
   a telephone status file connected to the telephone status monitor for receiving the telephone status from the plurality of telephones, the telephone status file connected to and accessible via the network;
   a called party processor connected to the network; and
   a voice mail converter connected to the called party processor for converting an alpha numeric message to a voice mail message;
   the converter being further connected to a called party telephone for allowing a called party to access the voice mail message; and
   whereby the calling party processor can create an alphanumeric message to be sent to the called party processor over the network for subsequent conversion into voice mail by the voice mail converter.

3. A process for determining telephone status over a network comprising:
   a calling party inputting a called party's telephone number via a calling party processor
   monitoring the telephone of the called party to determine the telephone status of the called party
   making the status of the called party's telephone available in a file;
   accessing the called party telephone status file over a network;
   the calling party creating an alpha numeric message;
   sending the alpha numeric message over the network to a called party processor;
   the called party processor receiving the alphanumeric message;
   the received alphanumeric message being converted to voice mail via a voice mail converter; and
   the called party accessing voice mail to receive the converted alpha numeric message.

4. A process for determining telephone status comprising:
   accessing a telephone status file over a network;
   monitoring the status of a plurality of telephones and providing that telephone status to the telephone status file;
   periodically updating the telephone status file with the status of telephones being monitored; and
   notifying a calling party by beeper that a called party telephone is in an on-hook condition.

* * * * *

UNITED STATES PATENT AND TRADEMARK OFFICE
CERTIFICATE OF CORRECTION

PATENT NO. : 6,175,616 B1
DATED : January 16, 2001
INVENTOR(S) : Jon L. Roberts and Elliott D. Light It is certified that error appears in the above-identified patent and that said Letters Patent is hereby corrected as shown below:

<u>Title page,</u>
Item [22], PCT Filing Date, change from "10/20/1997" to -- 11/03/1997 --.

Signed and Sealed this

Thirty-first Day of August, 2004

JON W. DUDAS
*Director of the United States Patent and Trademark Office*